United States Patent [19] [11] Patent Number: 5,237,839
Dehne [45] Date of Patent: Aug. 24, 1993

[54] GAS ABSORBER AND REFRIGERATION SYSTEM USING SAME

[75] Inventor: Hans-Joachim Dehne, Los Altos, Calif.

[73] Assignee: Gas Research Institute, Chicago, Ill.

[21] Appl. No.: 887,698

[22] Filed: May 22, 1992

[51] Int. Cl.$^5$ .................................... F25B 15/00
[52] U.S. Cl. ........................... 62/476; 62/495; 62/483
[58] Field of Search ............ 62/476, 483, 485, 486, 62/489, 495, 101

[56] References Cited

U.S. PATENT DOCUMENTS

| | | | |
|---|---|---|---|
| 1,849,685 | 3/1932 | Munters | 62/495 |
| 3,394,926 | 7/1968 | Whitlow et al. | 62/489 |
| 3,638,452 | 2/1972 | Kruggel | 62/485 |
| 4,127,009 | 11/1978 | Phillips | 62/101 |

*Primary Examiner*—Albert J. Makay
*Assistant Examiner*—William C. Doerrler
*Attorney, Agent, or Firm*—Heller, Ehrman, White & McAuliffe

[57] ABSTRACT

An absorption refrigeration system with ammonia as refrigerant and a salt solution as absorbent operates with an improved margin of safety to crystallization of the salt solution by incorporating an absorber having a precooler and narrow nozzles. The precooler serves to additionally lower the temperature of the salt solution before it is caused to absorb ammonia exothermically, and the nozzles are for injecting the salt solution into ammonia gas flows, while maintaining the solution on the upstream side at relatively high pressure. The flow characteristics of the gas-liquid mixture through absorber tubes change from churn flow to slug flow and finally to bubble flow. A blower is provided for recycling a portion of the ammonia gas back to the absorber for optimizing absorption efficiency. The precooler and the absorber tubes are cooled evaporatively to reduce operating temperatures and system operating costs.

15 Claims, 6 Drawing Sheets

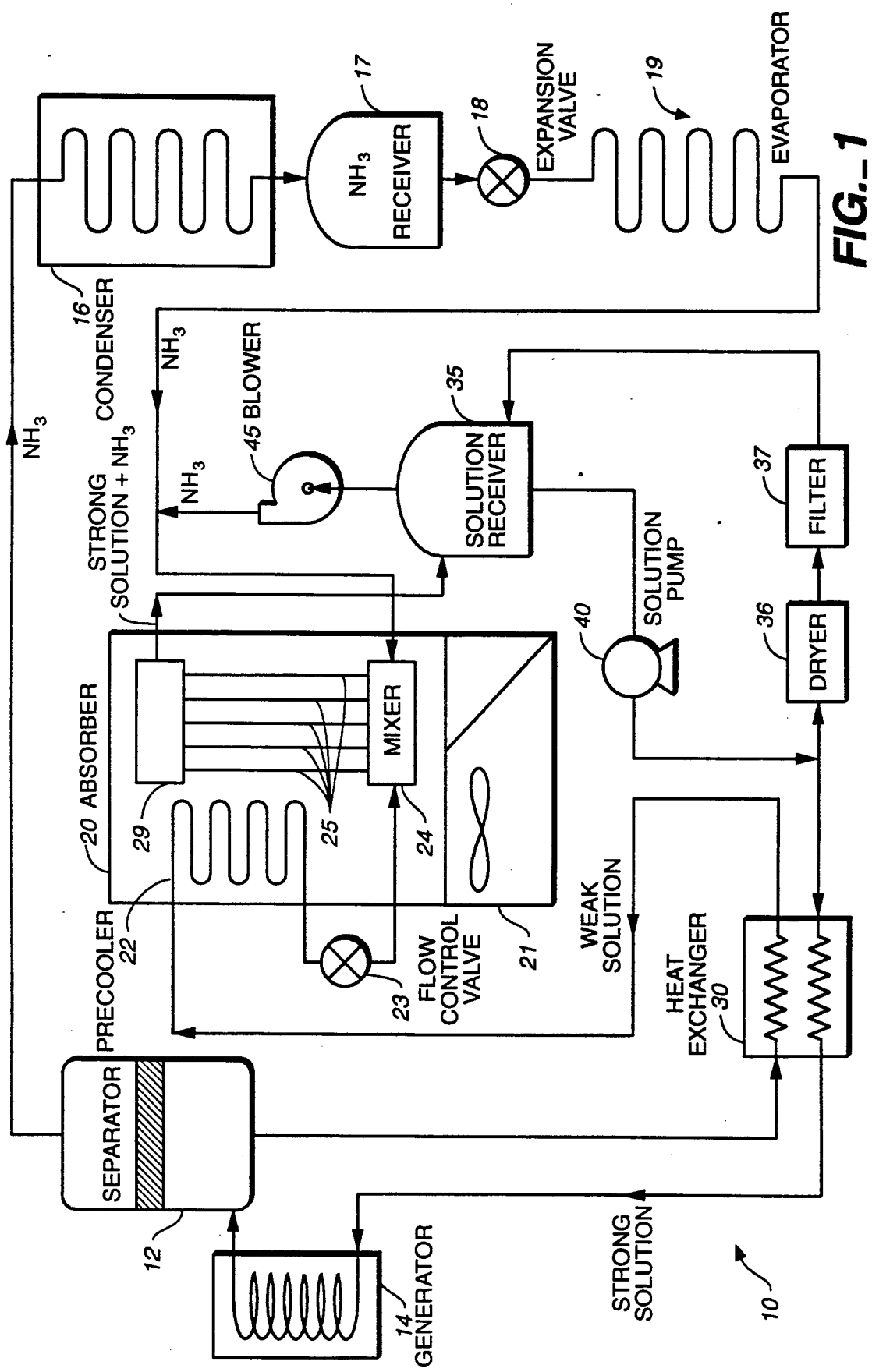
FIG._1

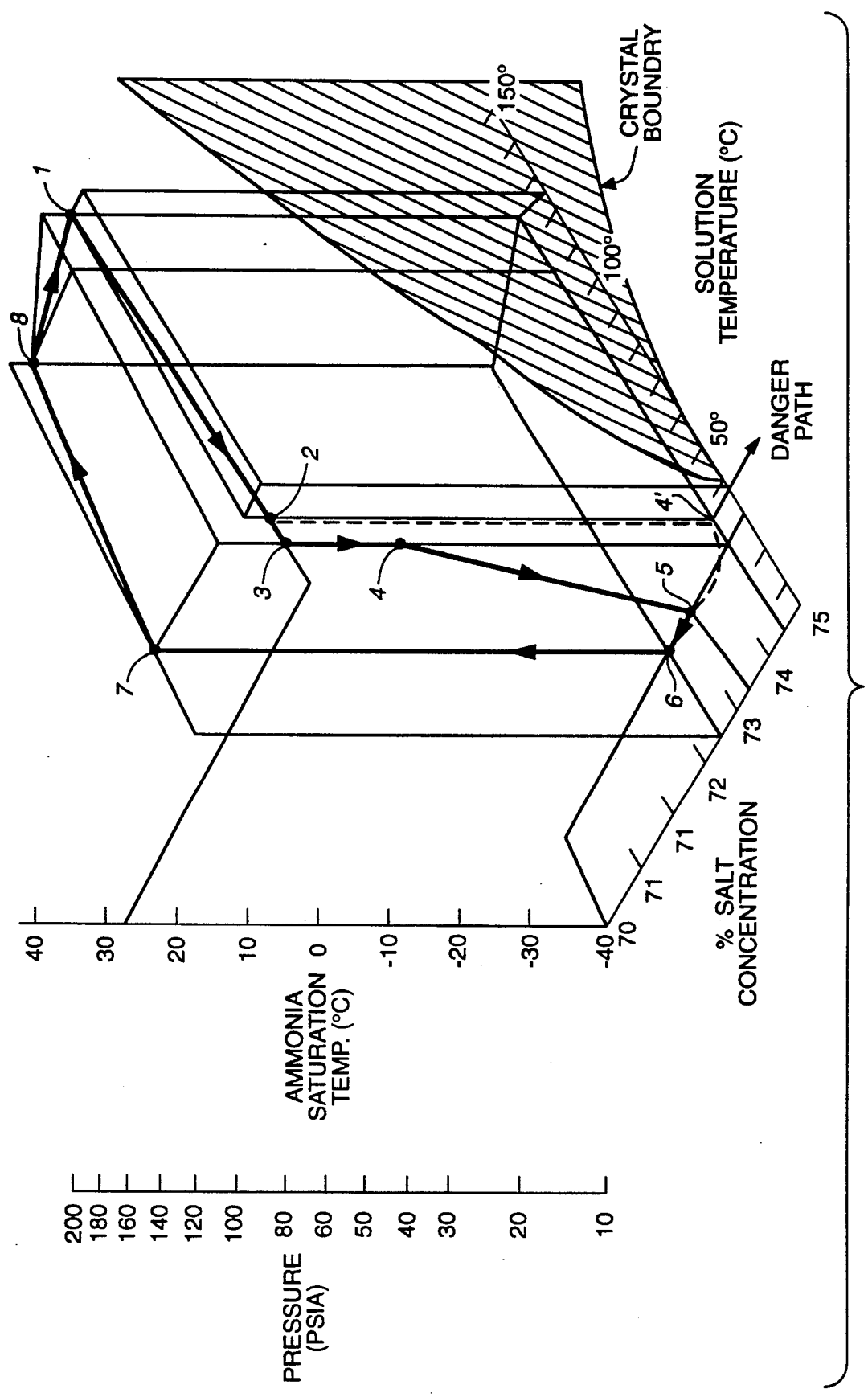
FIG._2

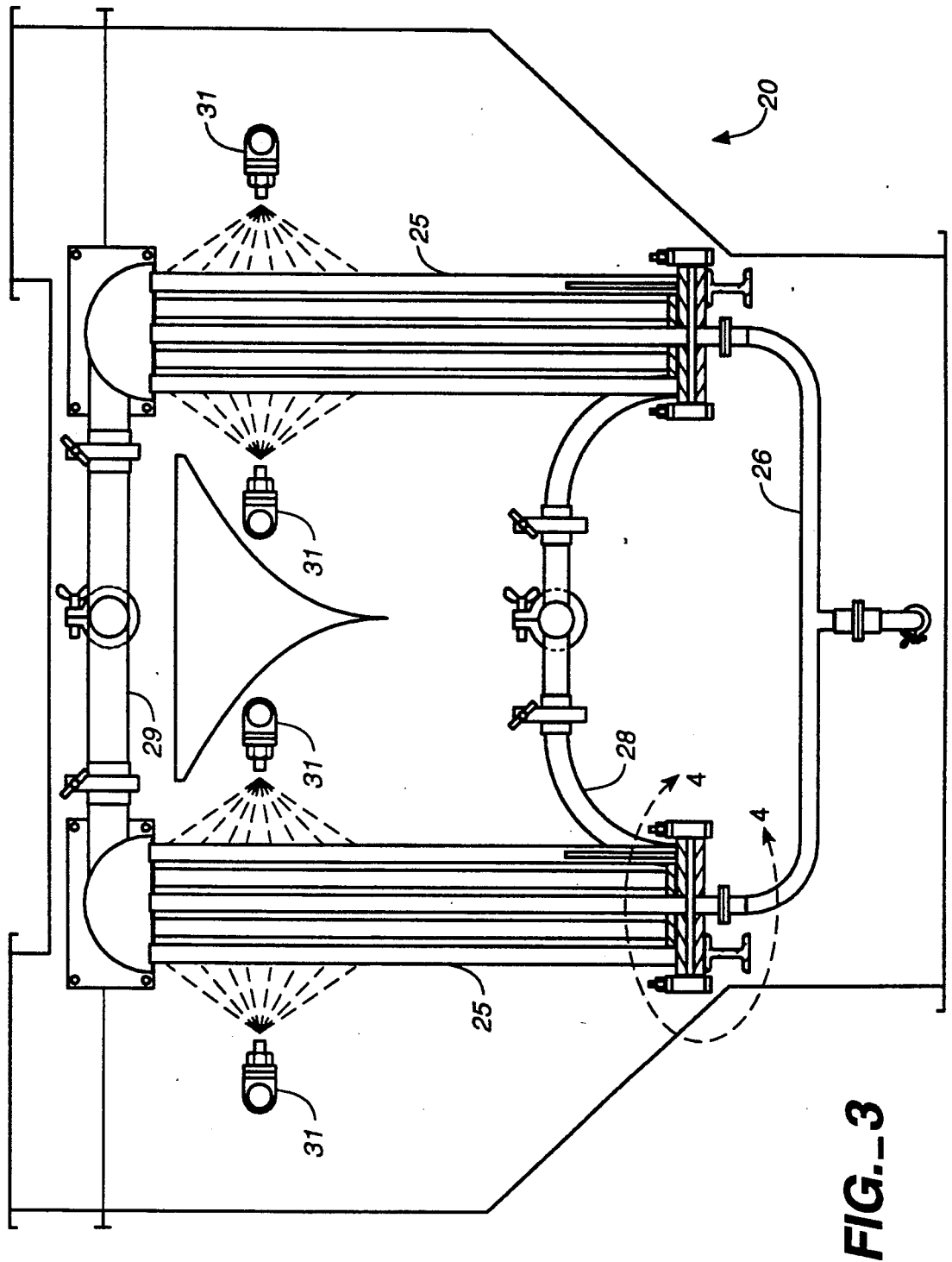
FIG._3

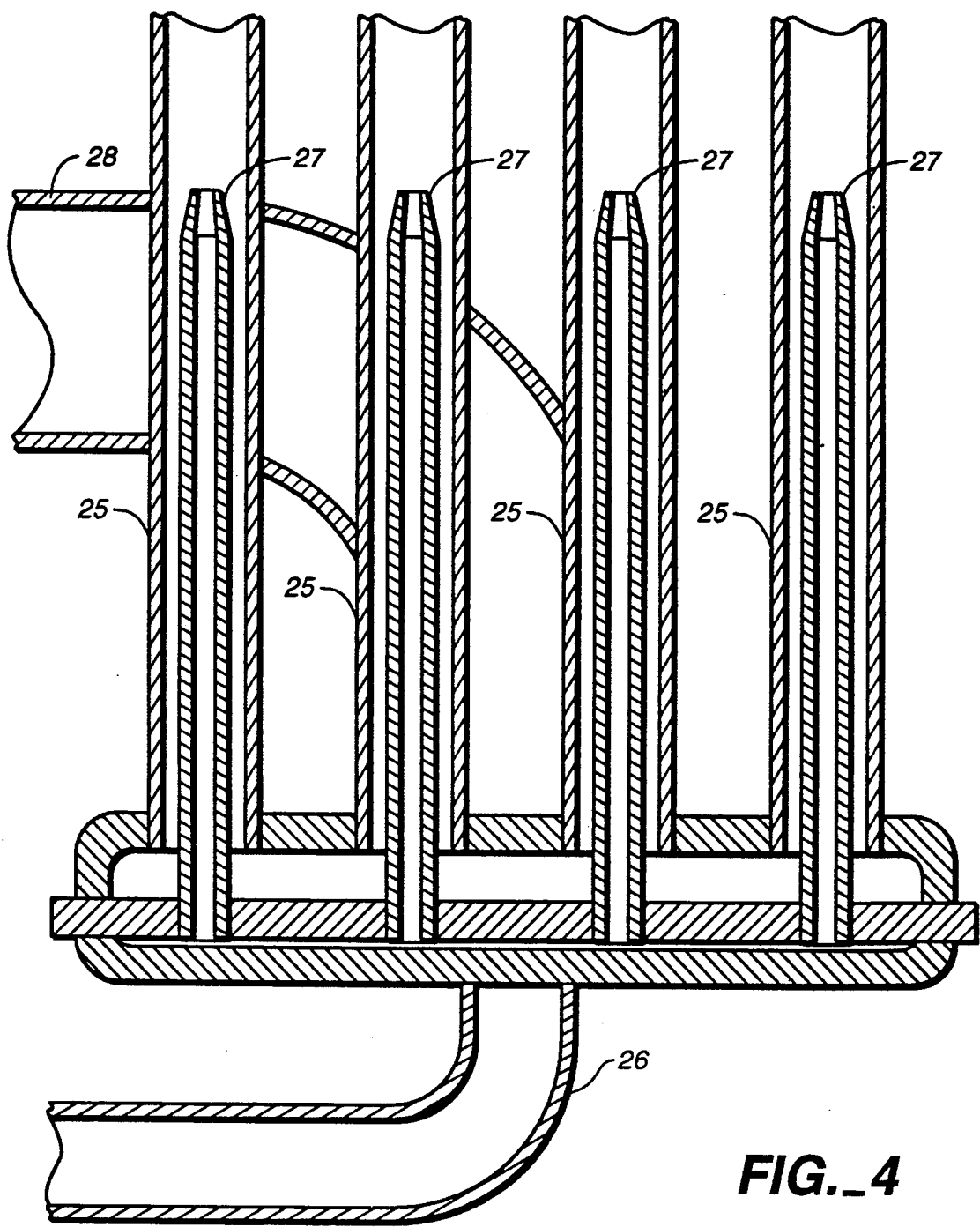
FIG._4

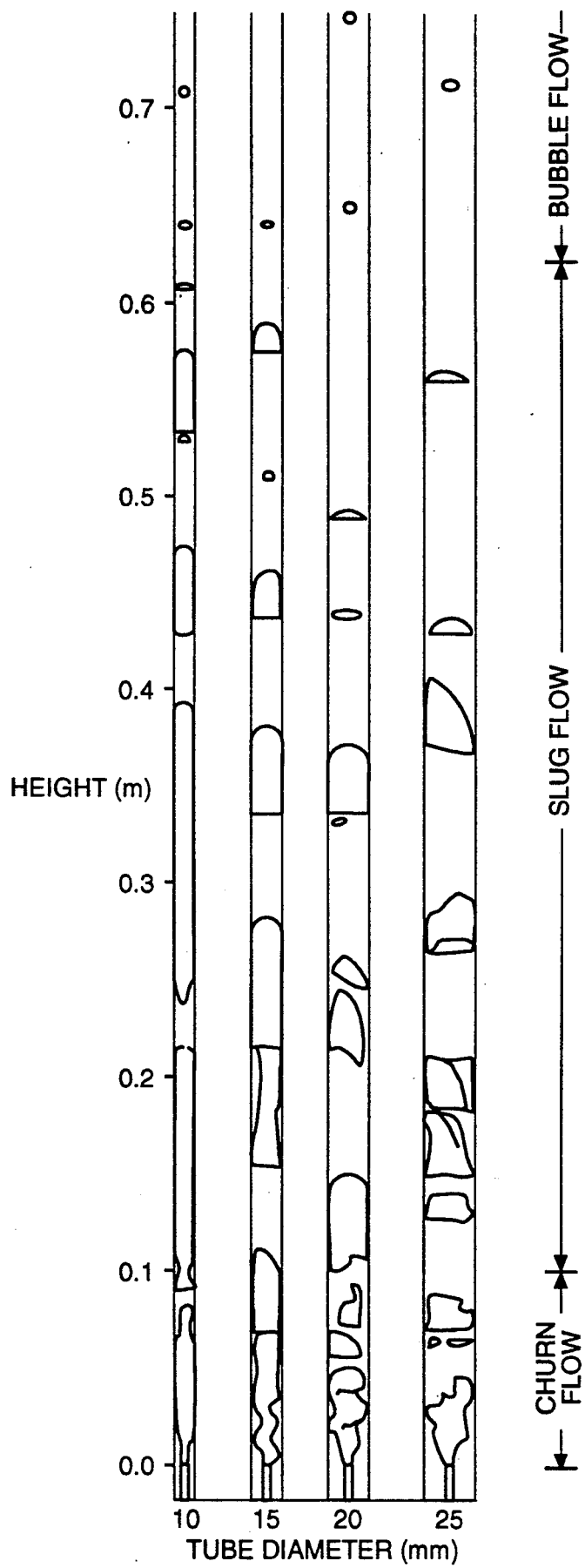
FIG._5

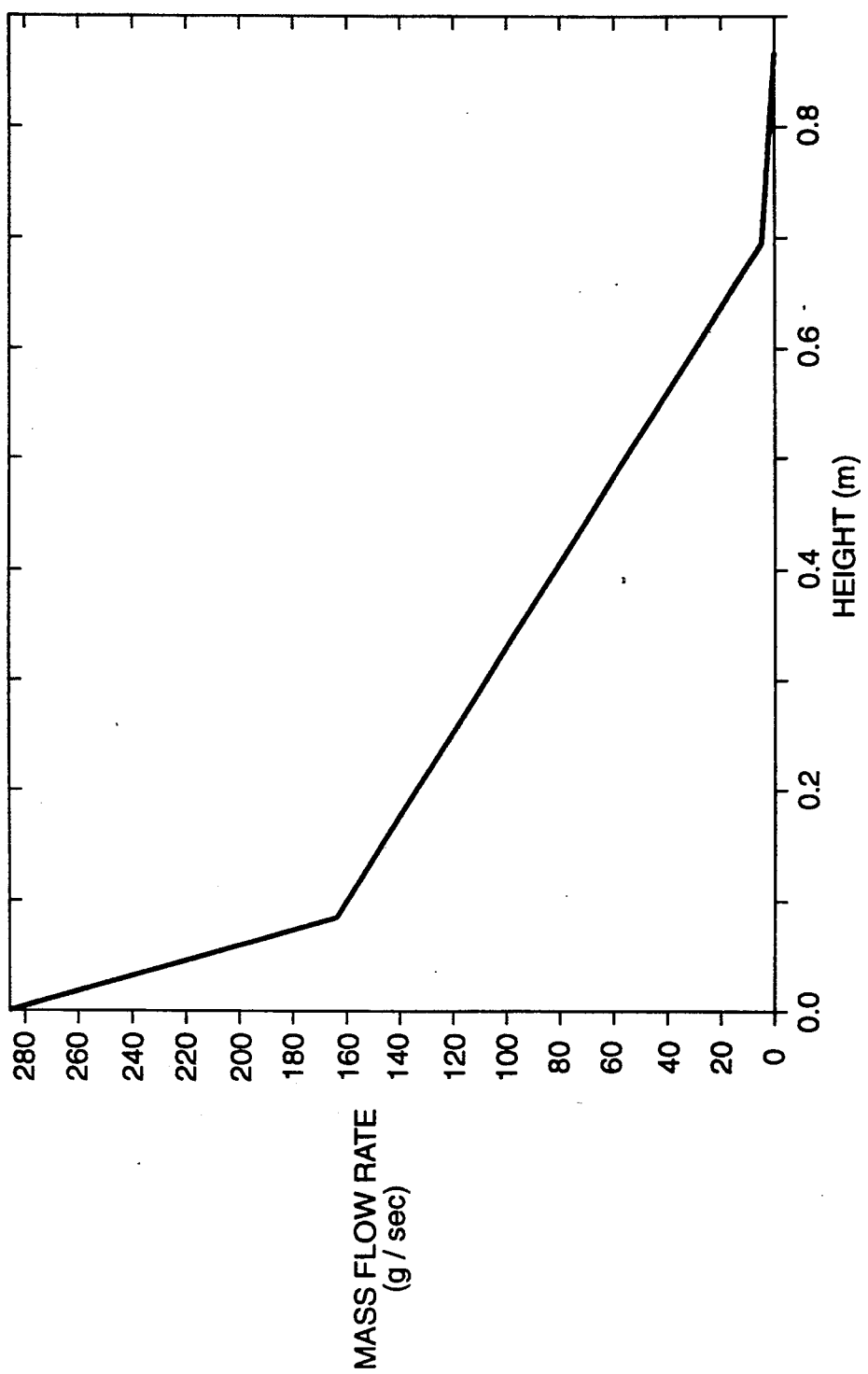
FIG._6

GAS ABSORBER AND REFRIGERATION SYSTEM USING SAME

BACKGROUND OF THE INVENTION

This invention relates to a gas absorption refrigeration system that can operate at temperatures as low as −40° C. and, more particularly, to an improved gas absorber for use in such a system for causing a refrigerant gas such as ammonia to be absorbed into an absorbent salt solution.

Mechanical compressor systems have long dominated the field of refrigeration, but the ozone-depleting characteristics of chloro-fluoro-carbons are a serious problem. Moreover, mechanical vapor compression systems are found to have little thermodynamic superiority over absorption systems as a result of the need to convert thermal energy into mechanical energy at a low temperature for the compression system. Consequently, there is currently a renewed interest in absorption refrigeration systems.

Various aspects of this technology have been discussed by Carlos Alberto Infante Ferreira in his thesis entitled "Vertical Tubular Absorbers for Ammonia-Salt Absorption Refrigeration" published by The Technische Wetenschappen aan de Technische Hogeschool, Delft, Holland; Mar. 26, 1985. In order to improve the performance of an absorption refrigeration system for given working conditions, Ferreira considered firstly to identify favorable absorbent-refrigerant mixtures from a thermodynamic standpoint, secondly to improve the efficiency of system components, and thirdly to effect system modifications to the standard refrigeration cycle. Ammonia has been considered as one of the best refrigerants, and many salt solutions have been investigated. Ferreira considered sodium thiocyanate (NaSCN) solution to be the best but saw a definite advantage in the $NH_3$—NaSCN—NaI system because possible salting out effects are of concern only at lower temperatures and concentrations. Although significant efforts have been expended to find preferable salt solutions, however, the identification of new salt solutions has been only partially successful, and it is therefore an object of the present invention to provide an improved system for carrying out a refrigeration cycles to expand the capabilities of presently known absorption refrigeration systems.

The temperature lift capability of a salt solution as applied to refrigeration systems is typically limited by its solubility characteristics. As a 50—50 mol % NaI—NaSCN ammonia solution is heated, for example, ammonia is driven off and when the salt concentration is approximately 75% (at equilibrium temperatures and pressures), the solution begins to crystallize due to insufficient ammonia and solubility limits. The higher the pressure, the higher the temperature must be to drive off ammonia to achieve the 75% level. If the temperature is lower than the equilibrium temperature, the vapor pressure will be lower than the equilibrium pressure. If the temperature is lowered further, the solution will crystallize at atmospheric pressure. In other words, beyond the solubility field of a solution, which is dependent on temperature and pressure, crystallization occurs, leading to failure of the refrigeration system.

A critical component of all absorption refrigeration systems is an absorber for causing the refrigerant to be absorbed by a refrigerant solution. Absorption of ammonia is an exothermic reaction, which requires that the absorbing medium be cooled effectively because, if the temperature rises, the equilibrium condition of the reaction shifts such that the pressure inside the vessel may potentially rise. Two types of absorbers which seem to be in general service are a vertical water-cooled, shell-and-tube absorber-condenser used in conjunction with a cooling tower water circulation system and an air-cooled absorber condenser. Water-cooled absorbers which derive cooling water from cooling towers operate at relatively high temperature differences between the ambient temperature and the absorber outlet and require larger amounts of water flow, if the temperature gain in the water is to remain small, as is required to maintain the lowest possible absorber pressure necessary for low temperature operation. The cooling pumps require much power and the piping can become very expensive, if the cooling tower cannot be located near the absorber. In addition, fans are required to operate the cooling tower. Air-cooled absorbers, on the other hand, require very large heat transfer surfaces and also consume a great deal of electrical power to drive the cooling fans.

It is therefore a general object of the present invention to provide an efficient absorption refrigeration system.

It is a more specific object of the present invention to provide an absorption refrigeration system with a refrigeration cycle capable of operating at temperatures as low as about −40° C. with an improved margin of safety.

It is another object of the present invention to provide an efficient, cost-saving and relatively compact gas absorber for such an absorption refrigeration system so as to increase the margin of safety to crystallization along the process path of the refrigeration system.

SUMMARY OF THE INVENTION

An absorption refrigeration system embodying the present invention, with which the above and other objects can be accomplished, may be constructed largely with prior art refrigerator components such as a generator and a separator for heating a refrigerant-rich solution to separate a refrigerant gas therefrom and to thereby obtain a refrigerant-lean solution, a condenser for emitting heat to thereby condense the refrigerant gas from the separator and an evaporator for absorbing heat from the environment to thereby evaporate the refrigerant gas condensed by the condenser. The refrigerant gas from the evaporator is caused to be absorbed into the refrigerant-lean solution in a specially designed gas absorber according to the present invention to thereby produce a refrigerant-rich solution. In order to improve efficiency of the absorber and therefore reduce the absorber heat exchange surface requirements, a portion of the ammonia gas which passes through the absorber is recycled to the absorber. The refrigerant-rich solution from the absorber is returned to the generator to complete an operation cycle.

The gas absorber according to the present invention is characterized in that the margin of safety regarding crystallization of the refrigerant-absorbing solution is significantly improved for the refrigeration system into which it is incorporated. Generally speaking, this is accomplished by removing the process cycle curve for the system operation farther away from the boundary beyond which crystallization occurs. For this purpose, the absorber is provided with an evaporatively cooled precooler for reducing the temperature of the refrigerant-lean solution such that the exothermic absorption of the refrigerant gas will take place at an additionally lowered absorption temperature, and the solution is injected into the refrigerant gas flows through narrow nozzles such that the pressure of the solution can be maintained relatively high on the upstream side. This ensures that the weak solution remains in liquid form upstream of the nozzles.

In order that the refrigerant gas be quickly absorbed, absorber tubes are designed such that the flow characteristics of the mixed gas-liquid phase therethrough change from churn flow to slug flow and finally to bubble flow. Since bubble flow has lower mass and heat transfer rates, means are provided for recycling a portion of the refrigerant gas to be recycled back into the absorber in order to overcome the disadvantage of bubble flow. The condenser and the absorber may be combined into a single unit and evaporative cooled technology adopted for reducing the system operating temperature, costs and saving space for installation.

With such a gas absorber incorporated into an absorption refrigeration system, the margin of safety to crystallization of the refrigerant-absorbent is significantly improved, and operations at temperatures as low as −40° C. becomes feasible with a proper choice of absorbent solution.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a process diagram for an absorption refrigeration system embodying the present invention;

FIG. 2 is a process cycle diagram for showing the process cycle according to the present invention for the system shown in FIG. 1 using a 50—50 mol % NaI—NaSCN ammonia solution;

FIG. 3 is a sectional end view of a portion of the absorber;

FIG. 4 is a schematic sectional view showing the inlet portion of the absorber indicated by the dotted line 4 of FIG. 3;

FIG. 5 is a sketch for showing different characteristic flow pattern types encountered in vertical tubular absorbers with tubes having different diameters; and FIG. 6 is a graph showing schematically a typical relationship between gas phase mass flow rate in an absorber tube and the height inside the tube.

DETAILED DESCRIPTION OF THE INVENTION

The process diagram in FIG. 1 and the process cycle diagram of FIG. 2 will be referenced simultaneously to explain the basic structure and characteristics of an absorption refrigeration system 10 according to the present invention, as well as features required of its absorber. In what follows, the liquid absorbent to be used in the system for absorbing ammonia as refrigerant will be simply referred to as a solution without specifically mentioning any salt of which it is a solution. The solution is called lean or weak when its ammonia-content is relatively low and its salt content is high. It is called rich or strong when its ammonia-content is relatively high and its salt content is low. In FIG. 2, the boundary, beyond which crystallization of the solution would occur, is indicated by a shaded plane. In what follows, this plane will be referred to as the crystal boundary.

In FIG. 1, numeral 12 indicates a separator, through which is passed a high-pressure strong solution heated by a generator 14 to drive off ammonia. The generator 14 may be of a conventional gas-burning type, and the separator 12 serves to separate the ammonia gas from the strong solution from which it was driven off, thereby producing a weak solution with a reduced ammonia content. This process is represented in FIG. 2 by an arrow from Point 8 to Point 1, indicating a slight rise in the solution temperature and slight drop in pressure.

The ammonia gas, separated from the solution in the separator 12, is caused to pass through a condenser 16, where it is cooled and condenses. The condensed ammonia gas is collected in a container, referred to as an ammonia receiver 17 in FIG. 1, and is introduced through an expansion valve 18 of a known type into an evaporator 19 where heat absorbed from the environment causes the liquid ammonia to evaporate.

The weak solution from the separator 12 with a low ammonia content is passed through a heat exchanger 30 and introduced into an absorber 20, of which the basic purpose is to cause the ammonia gas from the evaporator 18 to be absorbed into the weak solution received from the separator 12 to thereby produce a strong solution with a high ammonia content. In FIG. 2, the effect of the heat exchanger 30 on the solution, as it is transported from the separator 12 to the absorber 20, is represented by an arrow from Point 1 to Point 2. Since the absorber 20 is one of the critical elements of the improved refrigeration system 10 of the present invention and is a key to its successful operation, some of the new features of the absorber 20 embodying the invention, as well as how such new features contribute to the successful operation of the system 10, will be explained first with reference only to FIGS. 1 and 2. Its structure will be described more in detail further below.

With prior art gas absorbers, such as those tested and described by Ferreira, absorption of ammonia gas is effected by causing a weak solution to flow through absorber tubes from a large manifold and injecting ammonia vapor into these tubes through small vapor inlet nozzles. With an absorber thus structured, the pressure within the solution drops immediately and is low the absorption begins to take place. In FIG. 2, this process would appear as shown by the dotted line from Point 2 through Points 4' and 5 to Point 6. In other words, if a prior art absorber as described above were used in the system 10, the process cycle curve would come dangerously close to the crystal boundary. If a safety margin of 8°∼9° C. is required to be imposed, such a system would be able to achieve operations only down to about −32° C. What is required of the absorber 20 according to the present invention, therefore, is that the path from Point 2 to Point 6 in the process cycle diagram of FIG. 2 be sufficiently removed away from the crystal boundary such that the system 10 can be operated down to −40° C. with an increased margin of safety.

For the reason given above, the absorber 20 according to the present invention is provided with a precooler 21 for further cooling the solution which has already been cooled by passing through the heat exchanger 30. The advantage of thus cooling the solution before it is allowed to mix with ammonia vapor should be apparent with reference to FIG. 2, wherein the effect of this additional cooling by the precooler 21 is represented by an arrow from Point 2 to Point 3. In other words, the solution is at a lower temperature when it begins to absorb the ammonia gas, and this temperature difference removes the cycle path farther away from the crystal boundary.

The part of the absorber 20 where the ammonia-lean solution from the separator 12 which has also passed through the heat exchanger 30 is mixed with the ammonia gas from the evaporator 18 is identified in FIG. 1 as a mixer 24. Details of the mixer 24 are shown in FIG. 4 with injection nozzles 27 through which ammonia-lean solution is injected into the absorber tubes and mixed with reacting solution and ammonia. The mixture of the solution and the ammonia gas which is being absorbed is then caused to flow upwards together through absorber tubes 25, and a resulting ammonia-rich solution is introduced into a solution receiver 35. Numeral 23 in FIG. 1 represents a valve for controlling the flow rate and pressure through the precooler 22 and ensuring that the ammonia-lean solution is maintained at an elevated pressure on the upstream side thereof.

The mixer 24 according to the present invention is so designed as to be able to keep the solution in a relatively high-pressure condition on the upstream side thereof and to keep the pressure drop within the absorber 20 as low as possible while causing the ammonia gas to be absorbed as quickly as possible for allowing lowest temperature operation. In FIG. 2, the arrow from Point 3 to Point 4 represents the pressure drop through the precooler control valve 23, the arrow from Point 4 to Point 5 represents the pressure drop due to mixing with absorber resident solution and the absorption of the ammonia gas as the ammonia-lean solution is injected into the absorber tubes 25 which are evaporatively cooled on the outside, and the arrow from Point 5 to Point 6 represents the absorption of the gas by the solution within the absorber tubes 25 and as the solution flows into and is collected in the solution receiver 35. In a conventional cycle, as explained above, the entire pressure drop would take place within a manifold and a control valve. As the ammonia-lean solution with a high salt concentration is introduced, its initial contact with ammonia may cause a rapid temperature rise and localized crystallization, and such local heating may result in an increase in evaporator pressure and hence in nonoptimum operation. If there is insufficient back pressure, crystallization may also occur in the heat exchanger 30. It is to be noted that Point 5 in FIG. 2 is substantially removed from the crystal boundary compared to Point 4'.

The ammonia-rich solution collected in the solution receiver 35 is sent to the separator 12 through the aforementioned heat exchanger 30 and the generator 14 by means of a solution pump 40 which serves to raise the pressure of the strong solution as indicated in FIG. 2 by an arrow from Point 6 to Point 7. The heat exchanger 30 is for transferring heat from the ammonia-lean solution from the separator 12 to the ammonia-rich solution from the solution receiver 35. The arrow from Point 7 to Point 8 in FIG. 2 indicates the temperature increase of the ammonia-rich solution as it travels through the heat exchanger 30.

A dryer 36 and a filter 37 may be provided, for example, as shown in FIG. 1 for accepting a portion of the strong solution from the solution receiver 35 to dry and filter the accepted solution. This piping configuration may be expected to be sufficient for the purpose of maintaining an adequate level of dryness and cleanliness of the solution. This configuration is advantageous in that the dryer 36 and/or the filter 37 may be serviced while the system 10 is in operation because the system 10 can continue to operate for a short period of time without the dryer 36 or the filter 37.

Next, the structure of a portion of the absorber 20, including its mixer 24 and lower end portions of the absorber tubes 25 will be described more in detail. With reference to FIGS. 3 and 4, the incoming weak solution from the precooler 22, of which the flow rate is controlled by the precooler control valve 23, is introduced into the mixer 24 through a solution inlet manifold 26 and injected into the absorber tubes 25 through small injection nozzles 27. The ammonia gas from the evaporator 18 is introduced into a gas inlet manifold 28 and drawn into the absorber tubes 25 from the gas inlet manifold 28 and through the space with an annular cross-sectional shape surrounding the injection nozzles 27. Each nozzle 27 has a predetermined pressure drop during normal operation such that the interior of the solution inlet manifold 26 is maintained at a pressure higher than where the absorption actually takes place (as shown by Point 4 in FIG. 2). The weak solution is introduced at a point approximately 5 to 20 diameters downstream of where the ammonia gas is introduced from the gas inlet manifold 28. If this distance were smaller, the solution would be entering in a region with poor heat transfer characteristics. If this distance were greater, this would adversely affect the cost of the absorber 20. The weak solution need not be introduced in each of the absorber tubes 25. The specific system design parameters will determine the number of injection tubes 25 required. It is to be noted that, according to conventional vertical tubular absorber technology, it is usually the gas to be absorbed that is injected into the stream of a liquid absorbent. The injection method of the present invention is an exact opposite.

Although the absorber tubes 25 are shown vertical, they may be inclined or may have serpentine configurations. What is important is that the flow be concurrent and upwards to an upper manifold 29 in which the absorber tubes 25 terminate. The pressure drop through each tube must be similar and the absorber 20 must be installed level or the inlets and outlets to all absorber tubes 25 level. The gas inlet piping to the mixer 24 must be arranged to prevent "back drainage," that is, the gas inlet piping must be routed such that its elevation close to the absorber 20 be higher than the absorber tube inlets in close proximity to the absorber installation, as shown in FIG. 3, and that any liquid that may accumulate in the gas piping drain back to the absorber tubes 25. The upper manifold 29 serves to contain an overflow. The overflow is located such that all tubes are flooding during normal operation. The overflow is sized sufficiently large to be filled to half its flow capacity such that the upper half of the upper manifold 29 is filled with gas.

As stated above, the absorption of ammonia must proceed quickly in order to efficiently remove Point 5 of FIG. 2 from the crystal boundary. Absorption requires, however, that the gas to be absorbed contact the surface of the absorbing medium. Higher absorption can be achieved if the liquid-to-gas contact surface is large. Thus, the diameter of the absorber tubes 25 is determined so as to establish a churn/slug flow therethrough. The design criteria and procedure for this purpose are thoroughly discussed in the aforementioned thesis by Ferreira. During the absorption process in a vertical tubular absorber, the flow characteristics change from churn flow to slug flow, and finally to bubble flow as illustrated in FIG. 5 for different tube diameters. The churn flow region is merely an entrance effect due to high volumetric gas entrance velocities. In this region, there is a co-current upward flow of both phases. In the slug flow region, the gas phase rises in the form of bullet-shaped bubbles called slugs, large relative to the diameter of the tube and separated by liquid. The liquid flows downward at high velocity and forms a film around the gas bubbles. The bubble flow region is characterized by single isolated bubbles rising in co-current flow with a relatively large quantity of liquid.

It has been shown, however, that the bubble flow region has much poorer heat transfer and mass transfer characteristics. The relationship between the gas phase mass flow rate and the absorber height is typically as shown schematically in FIG. 6. In other words, ammonia is most efficiently absorbed into the solution in lower parts of the absorber tubes 25. In order to make a more effective use of the absorber tubes 25, therefore, the solution receiver 35 is designed to be only partially filled with the ammonia-rich solution at maximum flow capacity of the absorber 20. A blower 45 is provided for controllably recycling the ammonia gas in the solution receiver back to the absorber 20 through its mixer 24 for the purpose of optimizing the operation of the absorber tubes 25 in the slug/churn flow region.

Since the absorption of ammonia is an exothermic reaction, it is important that the absorbing medium be cooled effectively because the equilibrium condition of the reaction shifts as the temperature rises and this may cause a rise in pressure within the reaction vessel. For this purpose, the absorber 20 according to the present invention is adapted to be cooled evaporatively. In FIG. 3, numerals 31 indicate spray nozzles, and the absorber unit shown in FIG. 3 is incorporated onto a standard commercially available fan housing and sump section (only schematically shown at 21 in FIG. 1).

The present invention has been described above with reference to only one example, but this example is intended to be merely illustrative, and not as limitative. In particular, FIG. 1 is a schematic process diagram and should be so interpreted. Many modifications and variations are allowed within the scope of this invention. For example, the condenser 16 and the absorber 20 may be combined together as a single evaporative absorber-condenser unit. Such a combined unit is advantageous in several respects such as lower operating temperature capabilities than are possible with cooling tower systems, initial cost savings and space saving. Fan horsepower is comparable to cooling tower systems and is about one-third of an equivalent air-cooled unit. Because of the low pumping head and reduced water flow, water pumping horsepower is approximately 25% of that required for the normal cooling tower-condenser-absorber installation. Because the cooling tower, heat exchange surface, water circulating pump and water piping may be combined in one assembled piece of equipment, the cost of handling and installing separate components is reduced. Such a combined unit may require only about 50% of the plan area of a comparably sized air-cooled installation.

In summary, such modifications and variations that may be apparent to a person skilled in the art are intended to be within the scope of this invention.

What is claimed is:

1. A refrigeration system comprising:

(a) a separator for separating a refrigerant gas from a refrigerant-rich solution to produce a refrigerant-lean solution;

(b) a condenser for emitting heat to thereby condense said refrigerant gas received from said separator and an evaporator for absorbing heat to thereby evaporate said condensed refrigerant gas;

(c) an absorber assembly including:

a precooler for precooling said refrigerant-lean solution received from said separator;

a mixer for mixing said refrigerant gas from said evaporator with said precooled refrigerant-lean solution received form said precooler to thereby form a gas-solution mixture, said mixer having nozzles for allowing said refrigerant-lean solution to be injected therethrough into a flow of said gas-solution mixture, said nozzles being adapted to cause said refrigerant-lean solution to experience a predetermined pressure drop thereacross; and absorbent tubes for allowing said gas-solution mixture to flow therethrough while causing said refrigerant-lean solution to absorb said refrigerant gas to thereby generate a refrigerant-rich solution;

(d) a solution receiver for receiving said refrigerant-rich solution through said absorber tubes and a manifold for containing an overflow through said absorber tubes during a normal operation of said refrigeration system, an upper part of said solution receiver serving to contain said refrigerant gas;

(e) recycling means for controllably recycling said refrigerant gas from said solution receiver into said absorber assembly; and (f) a solution pump for delivering said refrigerant-rich solution from said solution receiver to said separator through a generator for heating said refrigerant-rich solution.

2. The refrigeration system of claim 1 wherein said absorber further includes a control valve connected between said precooler and said mixer for controlling the flow rate of said refrigerant-lean liquid through said precooler.

3. The refrigeration system of claim 1 wherein said mixer further includes gas inlets through which said refrigerant gas is introduced into said absorber tubes, and wherein said nozzles open at downstream positions from said gas inlets by 5 to 20 diameters of said absorber tubes.

4. The refrigeration system of claim 1 wherein said absorber tubes extend upwards from said mixer.

5. The refrigeration system of claim 1 wherein said absorber assembly further includes means for evaporatively cooling said absorber tubes and said precooler.

6. The refrigeration system of claim 1 wherein said absorber tubes are so designed as to be able to allow said gas-solution mixture to travel therethrough in a churn-slug flow.

7. The refrigeration system of claim 1 wherein said recycling means includes a blower for removing said refrigerant gas from said solution receiver into said absorber assembly.

8. The refrigeration system of claim 1 further comprising a heat exchanger for transferring heat from said refrigerant-lean solution from said separator to said refrigerant-rich solution pumped by said solution pump towards said generator.

9. An evaporatively cooled gas absorber for causing a liquid to absorb a gas, said absorber comprising:
   an externally evaporatively cooled precooler for receiving and precooling a pressurized liquid;
   a mixer for mixing said gas with said precooled pressurized liquid received from said precooler, said mixer including nozzles for allowing said liquid to be injected therethrough into a flow of said gas, said nozzles being adapted to cause said liquid to experience a predetermined pressure drop thereacross;
   absorber tubes for allowing said mixed gas and liquid to flow upward therethrough while causing said liquid to absorb said gas; and
   receiving means for receiving through said absorber tubes said liquid which has absorbed said gas.

10. The gas absorber of claim 9 further comprising a control valve connected between said precooler and said mixer for controlling the flow rate and pressure of said liquid through said precooler.

11. The gas absorber of claim 9 wherein said mixer further includes gas inlets through which said gas is introduced into said absorber tubes, and wherein said nozzles open at downstream positions from said gas inlets by 5 to 20 diameters of said absorber tubes.

12. The gas absorber of claim 9 wherein said absorber tubes extend upwards from said mixer to said receiving means.

13. The gas absorber of claim 9 further comprising means for evaporatively cooling said absorber tubes an said precooler.

14. The gas absorber of claim 9 wherein said receiving means is no more than partially filled with said liquid during normal operations of said absorber.

15. The gas absorber of claim 9 wherein said absorber tubes are so designed as to be able to allow said mixed gas and liquid to travel therethrough in a churn-slug flow.

* * * * *